United States Patent

[11] 3,613,912

[72] Inventors Fred W. Dissmeyer
Elgin;
George E. Olson, Arlington Heights, both of Ill.
[21] Appl. No. 872,814
[22] Filed Oct. 31, 1969
[45] Patented Oct. 19, 1971
[73] Assignee A. O. Smith Harvestore Products, Inc.
Arlington Heights, Ill.

[54] UNLOADING MECHANISM FOR SEALED STORAGE STRUCTURE
16 Claims, 8 Drawing Figs.

[52] U.S. Cl. .................................................. 214/17 DA
[51] Int. Cl. .................................................. B65g 65/42
[50] Field of Search ........................................ 214/17 DA

[56] References Cited
UNITED STATES PATENTS
3,232,457  2/1966  Bernstein et al. ............. 214/17 DA
3,455,467  7/1969  Martini et al. ................. 214/17 DA

*Primary Examiner*—Robert G. Sheridan
*Attorney*—Andrus, Sceales, Starke & Sawall ABSTRACT: A mechanism for unloading a stored material from a sealed storage structure. The structure is supported on a foundation having a trough extending radially from the center of the structure to the exterior. Conveying members are located along the sides of the trough, while a stationary backbone or frame of a cutter arm assembly is positioned within the trough between the conveying members. The cutter arm assembly also includes a cutter arm which is adapted to rotate over the foundation and dislodge the stored material and convey the dislodged material to the center of the structure for delivery to the conveyors located within the trough. The conveyors act to convey the material within the trough to the exterior of the structure. The cutter arm assembly and conveying members are separate units and are independently driven so that the cutter arm assembly can be independently installed and removed from the storage structure.

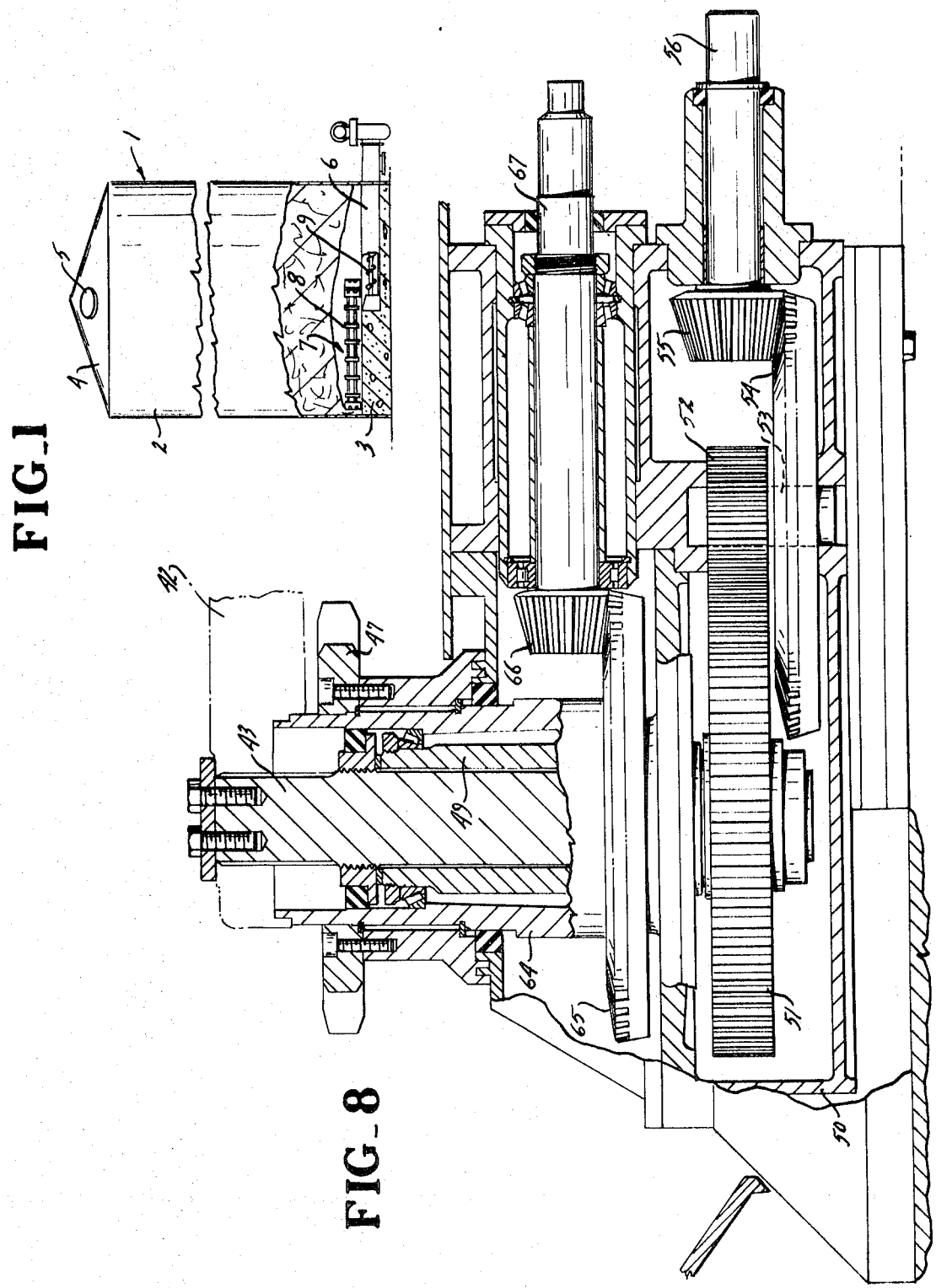

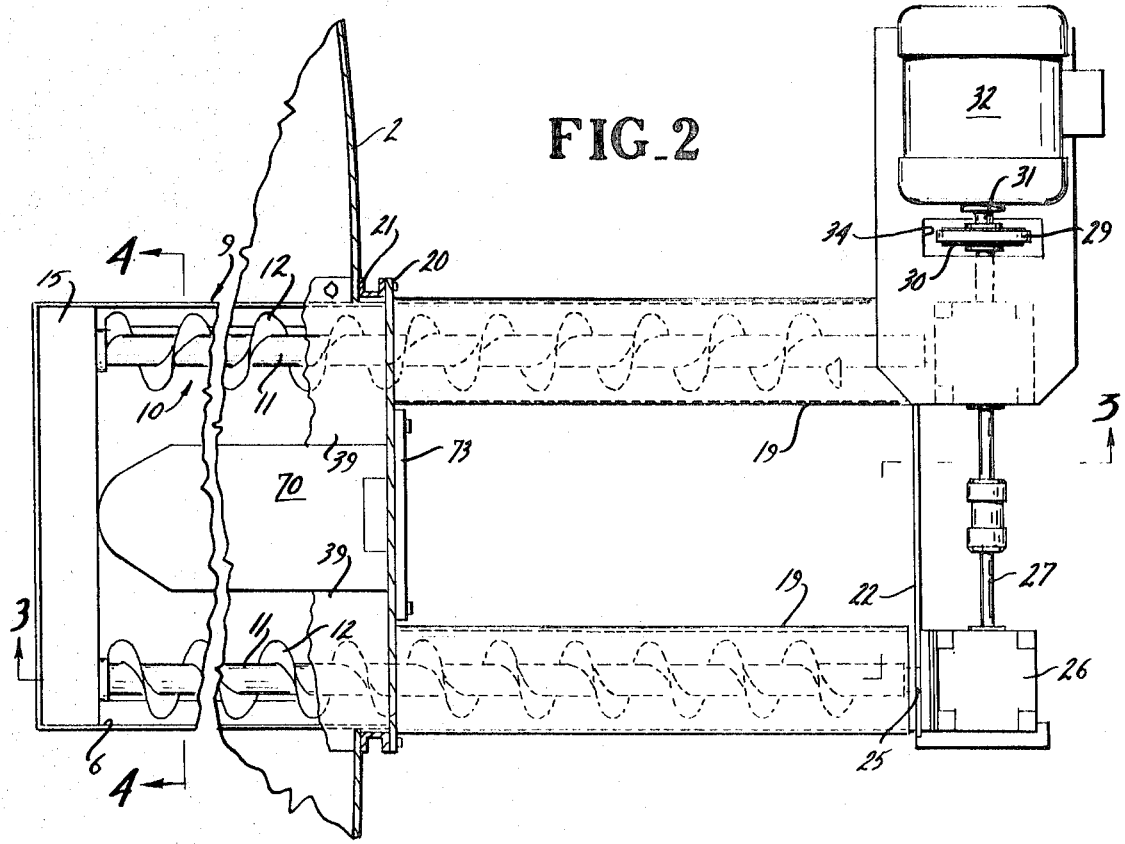
FIG_2
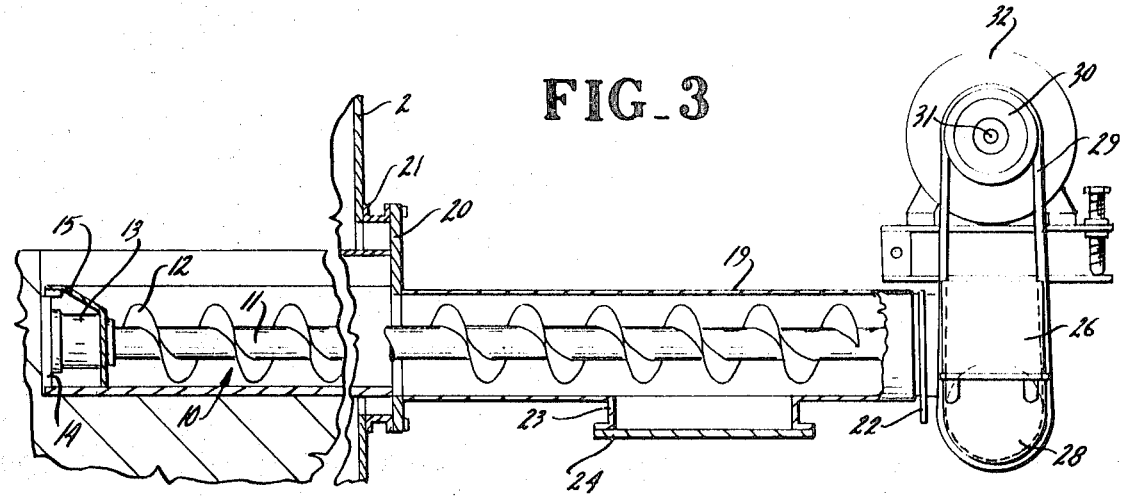
FIG_3

PATENTED OCT 19 1971
3,613,912
SHEET 3 OF 3
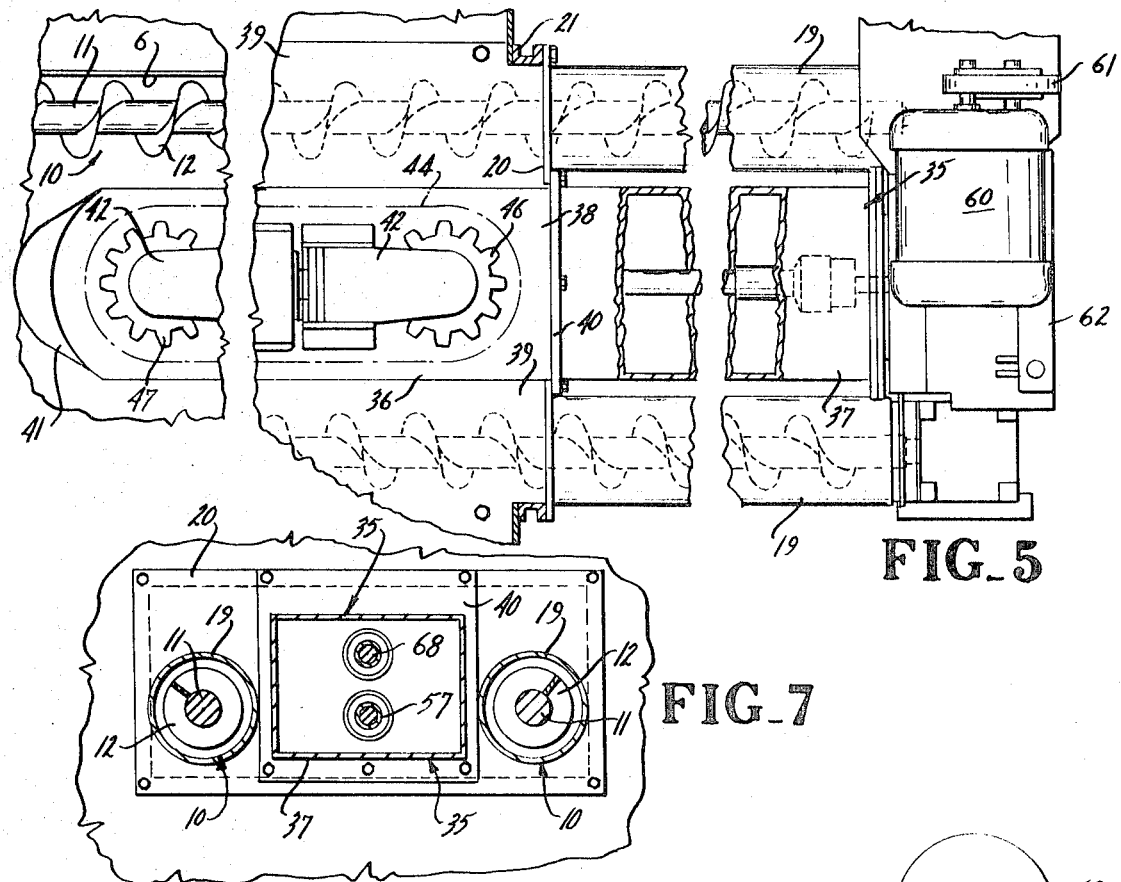
FIG_5
FIG_7
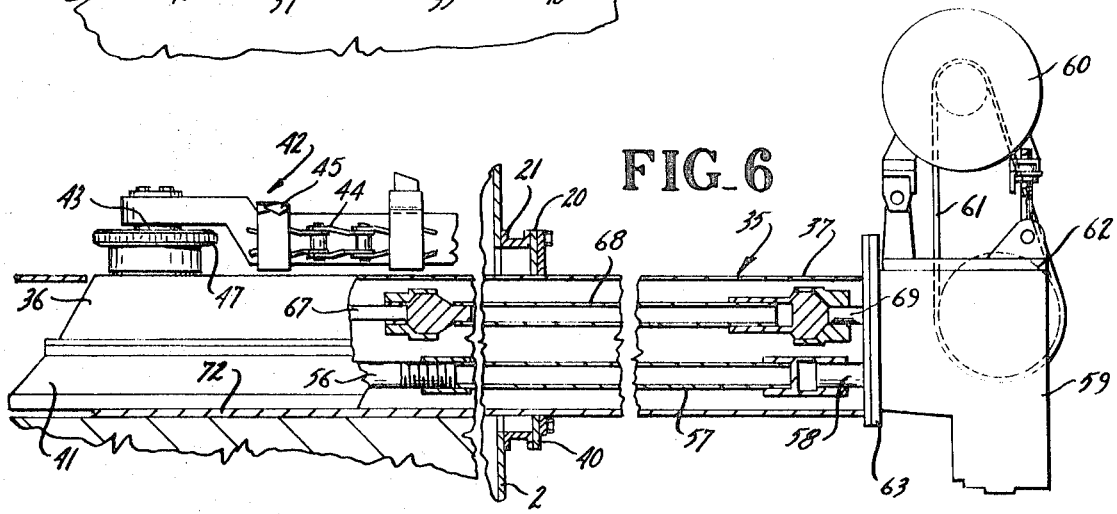
FIG_6
FIG_4
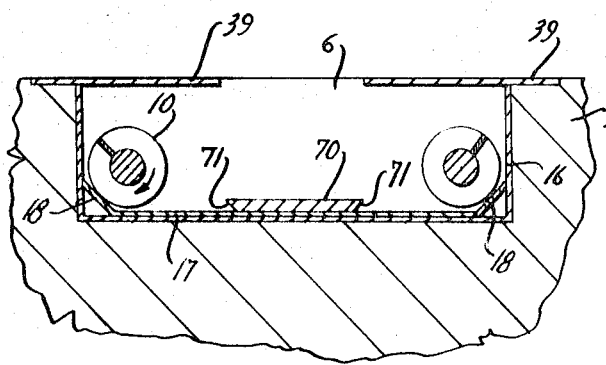
INVENTORS
FRED W. DISSMEYER
GEORGE E. OLSON
BY
Attorneys

UNLOADING MECHANISM FOR SEALED STORAGE STRUCTURE

This invention relates to a mechanism for unloading a stored material form a sealed storage structure, and more particularly to a bottom unloader for a storage structure, such as a silo.

Perishable food material, such as silage, haylage shelled corn, and the like, are frequently stored in sealed storage structures to minimize spoilage. With a sealed structure, the stored material is usually unloaded from the bottom of the structure by an unloading mechanism. The storage structure or silo rests on a foundation formed with radially extending trough which extends from the center of the silo to the exterior. The conventional bottom unloading mechanism includes a backbone or frame which is located within the trough and a cutter arm carrying an endless cutter chain is mounted for rotation with respect to the frame at the center of the silo and rotates across the foundation to dislodge the stored material and convey the dislodged material to the center of the silo where it it delivered into the trough. An endless conveyor operates within the trough to convey the discharged material to the trough to the exterior of the silo. With the conventional unloading unit, the cutter arm and the conveying mechanism are normally an integral unit with both being driven by a single motor located on the exterior of the storage structure or silo.

Fibrous material, such as silage, tends to arch over or bridge within the silo and the cutter arm, which operates in close proximity of the silo wall, acts to cut away the base of the arch, so that the silage mass will crumble and flow downwardly where it can be conveyed by the cutter arm to the central portion of the trough and then conveyed by the endless conveyor to the exterior. Thus, both the utter arm and the conveyor are utilized when unloading fibrous materials, such as silage,.

However, when unloading semifree-flowing materials, or free-flowing materials, it is not necessary to operate the cutter arm continuously and, in fact, operation of the cutter arm may result in undesired grinding and recirculation of the material. Moreover, the the operation of an endless chain cutter arm also tends to impose excessive wall loads on thin-walled storage structures. Therefore, the use of conventional endless chain cutter arm is not entirely satisfactory when loading free-flowing or semifree-flowing materials.

In the past an auger type of cutter arm has been utilized for unloading free-flowing or semifree-flowing materials. However, the auger type of unloader has not been satisfactory for unloading whole grain, such as barley, or ground grain where very fine hard-packed material is involved, nor has the auger type of cutter arm been able to handle high-moisture grain where freezing is a problem in the winter.

The present invention is directed to a mechanism for unloading stored material from a sealed storage structure, which is more versatile than prior types and can handle a wider range of materials. More specifically the unloading mechanism includes a pair of conveyor members which are located within the trough in the foundation along the sides of the trough. Located between the conveyor members is the stationary backbone or frame of the cutter arm assembly. In addition to the backbone, the cutter arm assembly includes a rotatable cutter arm carrying an endless cutter chain adapted to engage and dislodge stored material as the cutter arm rotates over the foundation and deliver the discharged material to the central portion of the trough where the conveyor members convey the dislodged material to the exterior of the structure.

The cutter arm assembly and the conveyor members are separate units and are independently driven so that the cutter arm assembly can be independently installed and removed from the structure. This enables the unloading mechanism to handle a wider variety of materials.

For example, when unloading fibrous material, such as silage, both the cutter arm and the conveyors can be operated, as in a conventional unloader, to dislodge and discharge the silage. When unloading semifree-flowing materials, it is only necessary to operate the cutter arm whenever the stored material may tend to arch or bridge over, and once the bridging condition has been eliminated, operation of the cutter arm can then be terminated. When dealing with free-flowing materials, it is only necessary to operate the cutter arm in order to remove the remaining portion of the material which is beneath its angle of repose on the foundation floor.

As a further advantage of the unloading mechanism of the invention, the speed of either the conveying members or the cutter arm can be independently varied to obtain optimum speeds for the particular materials being loaded. This results in decreased material degradation and reduces overloading of the cutter arm device and its components.

As the cutter arm assembly can be independently removed, it can be serviced without hampering the discharge operation of free flowing or semifree-flowing materials.

As an additional advantage, one cutter arm assembly can be used in conjunction with several structures or silos and this will result in a lower cost of operation and lower initial investment.

As the conveying mechanism located within the trough comprises a pair of augers, rather than an endless chain as in a conventional unloading mechanism, lower maintenance cost results.

Moreover, operation of an endless conveyor chain as used in a conventional unloading mechanism tends to pump air into the silo which destroys the airtight characteristics of the silo and promotes spoilage. In contrast to this, the auger conveyors used in the unloading mechanism of the invention operate only in a single direction, outwardly of the silo, with the result that a minimum amount of air will be drawn into the silo during the unloading operation.

Other objects and advantages will appear in the course of the following descriptions.

The drawings illustrate the best mode presently contemplated of carrying out the invention:

In the drawings:

FIG. 1 is a side elevation of a sealed storage structure, with parts broken away, incorporating the unloading mechanism of the invention;

FIG. 2 is a horizontal section showing the conveying unit installed with the storage structure;

FIG. 3 is a vertical section taken along line 3—3 of FIG. 2;

FIG. 4 is a vertical section taken along line 4—4 of FIG. 2;

FIG. 5 is a view similar to FIG. 2 showing the cutter arm assembly also installed with the structure;

FIG. 6 is a side elevation, with parts broken away of the cutter arm assembly;

FIG. 7 is a transverse section taken along line 7—7 of FIG. 5;

FIG. 8 is an enlarged fragmentary vertical section showing the center post construction of the cutter arm assembly.

The drawing illustrate a sealed storage structure or silo 1, which is adapted to contain storage material, such as corn silage, grass silage, shelled corn, chopped ear corn, soy meal, sugar flour, or the like. The storage structure 1 includes a generally cylindrical wall 2 which is supported on a foundation 3. The upper end of the cylindrical wall 2 is enclosed by a roof 4, and the stored material is loaded into the storage structure through an opening in the roof 4 which is normally enclosed by a sealed cover 5.

A radially extending trough 6 is formed in the upper surface of the foundation 3. An unloading mechanism 7 is utilized to remove the stored material from the storage structure and includes a cutter arm assembly 8 and a conveying unit 9 which is located within the trough 6.

The conveying unit 9 includes a pair of augers 10 which are located within the trough 6 and are positioned adjacent the side edges of the trough. Each of the augers 10 includes a horizontal shaft 11 which carries a spiral flight 12. The inner end of the shaft 11 is journaled within a bearing assembly 13 mounted on the end plate 14 disposed at the inner end of the trough 6. To prevent the stored materials from contacting the bearing assemblies 13 a shield 15 is connected to the upper edge of end plate 14 and extends over the bearing assemblies 13.

As best shown in FIG. 4, a generally U-shaped trough housing 16 is secured to the walls of the foundation which define the trough 6 and a base plate 17 is secured to the bottom surface of the trough plate 16. the augers 10 are spaced a slight distance above the base plate 17 and the side edges of the base plate 17 are provided with diagonally extending surfaces 18 against which the augers convey the stored material as it is being moved to the exterior of the storage structure.

The outer ends of the augers 10 extend through an opening in the wall 2 of the storage structure and are housed in generally cylindrical housings 19. A plate 20 connects the inner ends of the housings 19 and is bolted to the door frame 21 which borders the door or opening in the wall 2 of the storage structure. A similar plate 22 connects the outer ends of the auger housing 19 together.

The stored material which is conveyed outwardly by the auger 10 is discharged from the housings 19 through openings formed in the lower portion of the housings. The openings are bordered by frames 23 and the lower end of each frame is enclosed by a removable door 24. During the unloading operation of the doors 24 are removed so that the stored material can be discharged while during period of nonoperation the doors are sealed to the frames 23 in order to retain the airtight characteristics of the storage structure.

To drive the auger 10, the outer end of each auger shaft 11 is connected to an output shaft 25 of a spur gear-worm drive unit 26. The drive units 26 have a common input shaft 27 which carries a pulley 28. Pulley 28 is connected by a belt 29 to a pulley 30 secured to the motor drive shaft 31 of motor 32. Motor 32 is mounted on a platform 33 connected to the plate 22. Platform 33 is provided with an opening 34 and the belt drive 29 passes through the opening. With this drive system, operation of the motor 32 acts through the drive units 26 to rotate both of the augers 10 in a direction, as shown by the arrow in FIG. 4 to convey the stored material through the trough 6 to the housings 19 where it is discharged through the openings 23.

The cutter arm assembly 8 is an independent unit and can be installed and withdrawn separately from the conveyor unit 9. The cutter arm assembly 8 includes a generally rectangular frame or backbone 35 which is located between the augers 10. Backbone 35 includes an inner section 36 which is disposed within the storage structure and an outer section 37 that is located between the housings 19 on the exterior of the structure. The upper surface 38 of the inner section 36 is located between the floor plates 39 tat are secured to the foundations 3, and in combination with the floor plates 39, provides a generally smooth surface over which the cutter arm travels.

To secure the frame 35 to the conveyor unit 9 flange 40 is secured to the outer section 37 and is bolted flatwise against the plate 20 in conveyor unit 9. The plates 20 and 22 have a generally U-shaped configuration with a central recess within the backbone 35 of the cutter arm assembly is received.

The center post assembly 36 is attached to the inner section of the backbone 35 and is provided with a curved or sloping end 41 which serves a plow. As the cutter arm assembly 8 is installed in the trough 6, the plow 41 serves to push the material which may be located within the central portion of the trough laterally outward into the augers 10.

The cutter arm assembly 8 also includes a rotatable cutter arm 42 which is journaled around a central vertical post 43. Cutter arm 42 carries an endless chain 44 having a series of cutter teeth 45 that act to slice and dislodge the stored material as the chain 44 rotates in endless travel on the cutter arm 42. The cutter arm 42 and chain 44 can be similar in construction to that shown in the U.S. Pat. to Tiedeman No. 2,635,770. Chain 44 is trained about an idler sprocket 46 journaled on the outer end of cutter arm 42 and on a drive sprocket 47 journaled around the central post 43.

As the cutter arm 42 rotates within the storage structure, the weight of the cutter arm is supported by a roller mounted in the undersurface of the cutter arm and adapted to ride on the upper surface of the foundation 3. As previously mentioned, the upper surface 38 of backbone 35 is flush with the floor plates 39 so that the roller can ride over the trough 6.

The mechanism for rotating the cutter arm 42 about the storage structure is similar to that described in the aforementioned U.S. Pat. No. 2,635,770. As best illustrated in FIG. 8, the post 43 is journaled within a sleeve 49 mounted within housing 50 supported on the bottom surface of the trough 6. The lower of the post 43 carries a gear 51 which is driven by a pinion 52 secured to vertical shaft 53. In addition, to pinion 52, the shaft 53 carries a bevel gear 54 which is driven by bevel gear 55 on horizontal shaft 56. Shaft 56 is coupled to the inner end of a torque tube 57 that extends within the backbone and outer end of the torque tube is coupled to the output shaft 58 of a transmission 59 driven by motor 60 through a belt drive 61. The transmission 59 for the drive mechanism is a conventional type and provides a speed reduction from the motor 60 to the output shaft 58. The motor 60 is supported on a horizontal plate or platform 62 which in turn is secured to the vertical plate 63 attached to the outer end of backbone section 37. With this drive system operating from motor 60 through torque tube 57, the cutter arm is rotated slowly about the storage structure, generally at a rate of about 1 to 2 r.p.h.

To drive the cutter chain 44 in its endless path on the cutter arm 42, the sprocket 47 is secured to a sleeve 64 journaled about the sleeve 49. The lower end of the sleeve 64 carries a bevel gear 65 that is driven by a bevel gear 66 secured to the inner end of the horizontal shaft 67. The end of shaft 67 is coupled to the inner end of a torque tube 68 that extends within the backbone 35 and the outer end of the torque tube is connected to a second output shaft 69 of transmission 59. As previously mentioned, the drive mechanism including the transmission 59 is a conventional type and in itself forms no part of the present invention.

The conveying unit 9 is adapted to be permanently installed within the storage structure and is normally removed for maintenance or repair. However, the cutter arm assembly 8 can be installed and withdrawn as desired, depending on the particular materials being unloaded.

To guide the cutter arm assembly 8 in movement in an out of the storage structure, a guide plate 70 is secured to the upper surface of base 17 between the augers 10. As best shown in FIG. 4, the side edges 71 of guide plate 70 are undercut, and a pair of guide bars 72 are secured to the undersurface of the backbone 35 and are provided with diagonal edges which compliment the edges 71 on guide 70. The engagement of the guide bars 72 with the guide plate 70 provides a dovetail-type of connection which not only centers the backbone 35 within the trough but also prevents upward displacement of the cutter arm assembly with respect to the trough.

When unloading free-flowing materials, such as shelled corn, the cutter arm assembly 8 is normally not installed in the storage structure. In this situation a removable door 73 having a size similar to plate 40, is bolted to the plate 20 to close off the opening in plate 20, as illustrated in FIG. 2. When the stored material has been unloaded to a point where it reaches its angles of repose, the door 73 is removed and the cutter arm assembly 8 is then installed in the structure. ROtation of the cutter arm 42 will then dislodge and convey the remaining material to the center of the trough 6 where it will be delivered to the exterior of the structure by the augers 10. Thus, when unloading free-flowing materials, the cutter arm assembly is normally employed only after the material has reached its angle of repose to sweep the remaining material from the structure.

When unloading semifree-flowing materials the conveying assembly is not utilized unless the material bridges or arches over, and the cutter arm 42 can then be rotated to induce downward flow of the material.

With nonfree-flowing material, such as silage, the cutter arm assembly is installed and operates during the entire unloading operation to dislodge the material and convey it to the conveyor assembly 9, in a manner similar to that of a conventional unloading mechanism.

Due to the fact that the cutter arm assembly 8 and the conveyor unit 9 are independent components the machine is more versatile and can handle a wider range of materials with less material degradation. Moreover, the speed of the augers 10 and the cutter chain 42 can be independently varied in order to obtain the optimum speeds for each unit, depending on the type of material being unloaded.

We claim:

1. In combination with a sealed structure having a foundation supporting a generally flat floor in the structure and adapted to contain a stored material and having a trough extending in said foundation, an unloading mechanism comprising a conveyor unit disposed within the trough and operable to convey dislodged material within the trough to the exterior of the structure, a material dislodging assembly separate from said conveyor unit and including a frame disposed within the trough and extending generally parallel to the conveyor unit, with an upper portion of the frame providing a part of the flat floor of said structure when the material dislodging assembly is in place in the structure, said material dislodging assembly comprising an elongated cutting and conveying member mounted for rotation with respect to the frame and disposed upwardly from the frame to rotate horizontally within the structure above and over the flat bottom of said structure, and dislodge and convey the stored material to said trough, first drive means for driving the conveyor unit, and second drive means separate from said first drive means for operating said cutting and conveying member, said material dislodging assembly being separately removable from said structure to substantially fully open the trough so that when unloading certain stored materials only the conveyor unit is utilized.

2. The apparatus of claim 1 wherein said conveyor unit includes a pair of augers disposed in spaced parallel relation with said trough, said frame being disposed between said augers.

3. The apparatus of claim 2, and including a pair of housings located on the exterior of the structure and connected to said structure, the outer end of each of said augers being mounted for rotation within one of said housings.

4. The apparatus of claim 3, and including connecting means for connecting the housings together in parallel relationship, said connecting means being secured to the exterior surface of the storage structure.

5. The apparatus of claim 4 wherein said connecting means is provided with an opening to receive the frame of the material dislodging assembly.

6. The apparatus of claim 3 wherein said housing is provided with a discharge opening in the bottom surface for the discharge of stored material to the exterior.

7. The apparatus of claim 3 and including a supporting structure carried by the outer ends of said housings, said first drive means including a prime mover mounted on said supporting structure.

8. The apparatus of claim 1, and including guide means, said guide means including a plate secured to the bottom surface of the trough and having undercut side edges, said frame including a pair of spaced guide members disposed to engage and complement said undercut edges to guide the frame into position within the trough.

9. The apparatus of claim 1, and including means connected to the inner end of the frame for deflecting stored material located within the trough laterally toward the conveyor unit as the frame is introduced into the trough.

10. The apparatus of claim 9 wherein said deflecting means comprises a plow-shaped end on said frame.

11. In a storage structure adapted to contain a stored material and having a trough extending in the foundation of the storage structure, and unloading mechanism comprising a pair of augers disposed in parallel spaced relation within the trough and operable to convey dislodged material within the trough to the exterior of the structure, a material dislodging assembly separate from said augers and including a frame disposed within the trough between said augers, said material dislodging assembly also including a rotatable arm mounted for rotation with respect to the frame and disposed to rotate within the structure and dislodge the material and convey the dislodged material to the central portion of said trough, first drive means located on the exterior of the structure and operably connected to said augers, and second drive means carried by the frame and located on the exterior of the structure and operably connected to said arm for rotating the arm.

12. The apparatus of claim 11 and including guide means including a guide element secured to the bottom of the trough between said augers for guiding the frame in sliding movement into and out of the trough.

13. The apparatus of claim 11 wherein said second drive means includes a prime mover and a connecting element extending with frame and connecting the prime mover with said arm.

14. The apparatus of claim 11 and including housing means located on the exterior of the structure, said housing means having a pair of spaced parallel housing members disposed to receive the outer ends of the respective augers, said housing means provided with a recess located between said housing members to receive the frame of the material dislodging assembly, whereby the material dislodging assembly can be independently installed and removed from said structure.

15. The apparatus of claim 14 wherein the first drive means is mounted on said housing means.

16. The apparatus of claim 14 wherein the frame has a length substantially greater than the radius of the structure whereby the outer end of the frame projects outwardly of the structure.